(12) United States Patent
Buri et al.

(10) Patent No.: US 8,986,441 B2
(45) Date of Patent: Mar. 24, 2015

(54) USE OF POLYETHYLENIMINES AS ADDITIVE IN AQUEOUS SUSPENSIONS OF CALCIUM CARBONATE-COMPRISING MATERIALS

(71) Applicant: Omya International AG, Oftringen (CH)

(72) Inventors: Matthias Buri, Rothrist (CH); Samuel Rentsch, Aarburg (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 14/501,425

(22) Filed: Sep. 30, 2014

(65) Prior Publication Data

US 2015/0013571 A1    Jan. 15, 2015

Related U.S. Application Data

(63) Continuation of application No. 13/574,013, filed as application No. PCT/EP2011/050925 on Jan. 24, 2011.

(60) Provisional application No. 61/337,377, filed on Feb. 3, 2010.

(30) Foreign Application Priority Data

Jan. 27, 2010  (EP) .................................... 10151846

(51) Int. Cl.
| | | |
|---|---|---|
| *C08K 5/17* | (2006.01) | |
| *C09C 1/02* | (2006.01) | |
| *C08K 3/26* | (2006.01) | |
| *D21H 17/07* | (2006.01) | |

(52) U.S. Cl.
CPC .............. *C08K 5/17* (2013.01); *C01P 2004/61* (2013.01); *C01P 2006/10* (2013.01); *C01P 2006/22* (2013.01); *C01P 2006/40* (2013.01); *C09C 1/021* (2013.01); *C08K 3/26* (2013.01); *D21H 17/07* (2013.01); *C08K 2003/265* (2013.01)
USPC ....................................................... 106/465

(58) Field of Classification Search
None
See application file for complete search history.

(56) References Cited

U.S. PATENT DOCUMENTS

| | | |
|---|---|---|
| 4,106,949 A | 8/1978 | Malden |
| 6,291,634 B1 | 9/2001 | Tanaka et al. |
| 6,991,705 B2 | 1/2006 | Leino et al. |
| 2009/0209692 A1 | 8/2009 | Suau et al. |

FOREIGN PATENT DOCUMENTS

| | | |
|---|---|---|
| CN | 1247188 A | 3/2000 |
| EP | 0635602 A1 | 1/1995 |
| EP | 1795502 A2 | 6/2007 |
| EP | 2070991 A1 | 6/2009 |
| GB | 1481307 | 7/1977 |
| WO | 9730220 A1 | 8/1997 |
| WO | 0039222 A1 | 7/2000 |
| WO | 2004083316 A1 | 9/2004 |
| WO | 2008010055 A1 | 1/2008 |

OTHER PUBLICATIONS

Office Action for Colombian Application No. 12-144268-7.
Office Action dated Oct. 25, 2013 for Korean Application No. 10-2012-7022393.
Office Action for Mexican Application No. MX/a/2012/008649.
International Search Report dated Feb. 17, 2011 for PCT Application No. PCT/EP2011/050925.
Written Opinion of the International Searching Authority for PCT Application No. PCT/EP2011/050925.
Vanerek "Filler retention in papermaking by plymeric and microparticulate retention and systems." McGill University, Nov. 1, 2004.
Suty et al. "Role of surface charge in deposition of filler particles onto pulp fibers." Colloids and Surfaces, vol. 139 (1998) pp. 271-278.
Laarz et al. "Dispersing WC-Co powders in aqueous media with polyethylenimine." International Journal of Refractory Metals and Hard Metals, vol. 18 (2000) pp. 281-286.

*Primary Examiner* — Melissa Swain
(74) *Attorney, Agent, or Firm* — Amster, Rothstein & Ebenstein LLP

(57) ABSTRACT

Use of at least one polyethylenimine as an additive in an aqueous suspension, containing from 25 to 62 vol. % of at least one calcium carbonate-comprising material, wherein the use provides improved stability with regard to the conductivity of the suspension.

21 Claims, No Drawings

USE OF POLYETHYLENIMINES AS ADDITIVE IN AQUEOUS SUSPENSIONS OF CALCIUM CARBONATE-COMPRISING MATERIALS

CROSS-REFERENCE TO RELATED APPLICATIONS

This is continuation of U.S. application Ser. No. 13/574,013, filed Sep. 11, 2012, which is a U.S. national phase of PCT Application No. PCT/EP2011/050925, filed Jan. 24, 2011, which claims priority to European Application No. EP 10151846.2, filed Jan. 27, 2010 and U.S. Provisional Application No. 61/337,377, filed Feb. 3, 2010, the contents of which is hereby incorporated by reference.

The present invention relates to the technical domain of aqueous suspensions of calcium carbonate-comprising materials and additives added thereto.

In the preparation of aqueous suspensions of calcium carbonate-comprising materials, the skilled man is often required to select and introduce additives in order to regulate one or more characteristics of this suspension.

In making this additive selection, the skilled man must bear in mind that this additive should remain cost efficient and should not lead to unwanted interactions or effects downstream during the transportation, processing and application of this suspension.

Among the considerations of the skilled man that have rarely been addressed but which the Applicant has realized is of importance, is the selection of additives that do not cause a significant variation, and namely increase, in the electrical conductivity of the calcium carbonate-comprising material suspension.

Indeed, it may be advantageous to regulate aspects of the processing and transport of such a suspension based on measurements of the suspension's electrical conductivity.

For example, the flow rate of such a suspension through a given passage or unit may be controlled according to measurements made of the suspension conductivity. In the publication entitled "A Conductance Based Solids Concentration Sensor for Large Diameter Slurry Pipelines" by Klausner F et al. (J. Fluids Eng./Volume 122/Issue 4/Technical Papers), an instrument measuring the solids concentration of a slurry passing through pipelines of a given diameter based on conductance measurements is described. Based on these conductance measurements, it is possible to obtain a graphical display showing the variation of slurry concentration from the top to the bottom of the pipe, as well as the area-average concentration history.

The degree of filling of a container can likewise be managed by detecting conductivity at a given height along a container wall.

However, in order to use and take advantage of such regulation systems based on measurements of electrical conductivity, the skilled man is faced with the challenge of selecting additives needed to serve one or more functions that do not in parallel cause significant variations in the electrical conductivity values.

Among the functions of the additives used in calcium carbonate-comprising material suspensions, is the adjustment of the suspension pH, whether it is by acidification, neutralization, or alkalinisation of this suspension.

Suspension alkalinisation is notably required in order to match the pH of application environments into which the suspension is introduced, or in preparation for the addition of pH-sensitive additives. A step of raising the pH may also serve to disinfect or support the disinfection of a suspension.

Adjustments to pH may be necessary to avoid the unwanted dissolution of calcium carbonate on contact with an acidic environment during processing.

Such pH adjusting additives used in aqueous suspension of calcium carbonate-comprising material suspensions and available to the skilled man are numerous.

A first group of additives that may be used to raise the pH of an aqueous suspension of calcium carbonate-comprising materials are hydroxide-containing additives, and are especially alkali and earth alkali metal hydroxides.

For example, U.S. Pat. No. 6,991,705 refers to increasing the alkalinity of a pulp suspension, which may comprise calcium carbonate, by a combination of an alkali metal hydroxide feed, such as a sodium hydroxide feed, and a carbon dioxide feed. Potassium hydroxide, magnesium hydroxide and ammonium hydroxide are other such additives used to control the pH of a PCC suspension in a range from 10 to 13, as referred to in EP 1 795 502.

A second group of additives that may be used to raise the pH of an aqueous suspension of calcium carbonate-comprising materials are additives that do not contain hydroxide ions, but which generate such ions on reaction with water.

Such additives may be salts, such as sodium salts, of weak acids. Examples of this type of additive would include sodium acetate, sodium bicarbonate, potassium carbonate and alkaline phosphates (such as tripolyphosphates, sodium and/or potassium orthophosphates).

A further possibility is to employ nitrogen-based additives, including for example ammonia, amines and amides, in order to increase the pH of calcium carbonate-comprising material suspensions. Notably, these may include primary, secondary or tertiary amines. Alkanolamines used to increase suspension pH include for example monoethanolamine (MEA), diethanolamine (DEA), and methylaminoethanol (MAE).

All of the above additives raise the pH of the aqueous suspension according to a common mechanism, which is by providing or creating, following reaction with water, hydroxide ions in the suspension.

From the literature, it is known that increasing the hydroxide ion concentration under alkaline condition leads in parallel to an increased conductivity ("Analytikum", $5^{th}$ Edition, 1981, VEB Deutscher Verlag für Grundstoffindustrie, Leipzig, page 185-186 referring to "Konduktometrische Titration").

Given the above general knowledge documented in the literature, along with the supporting evidence that alkali and earth alkali hydroxides, as well as amines such as triethanolamine cause a significant conductivity increase in parallel to raising the pH of an aqueous suspension of calcium carbonate-comprising materials, as shown in the Examples section hereafter, the skilled man could have no expectation that a particular pH regulating agent, that raises the suspension pH according to the same mechanism as these additives, i.e. the resulting introduction of hydroxide ions in the suspension, would cause only a minimal conductivity increase.

It was therefore entirely by surprise, and in contrast to the expectation based on common additives used to increase pH, that the Applicant identified that polyethylenimines (PEIs) can be used as an additive in an aqueous suspension and having a pH of between 8.5 and 11 and containing from 25 to 62 vol. % of at least one calcium carbonate-comprising material, to increase the suspension pH by at least 0.3 pH units, while maintaining the suspension conductivity to within 100 µS/cm/pH unit.

Therefore, a first aspect of the present invention refers to the use of at least one polyethylenimine as an additive in an aqueous suspension containing from 25 to 62 vol. %, based on the total volume of the suspension, of at least one calcium carbonate-comprising material and having a pH of between 8.5 and 11, for increasing the suspension pH by at least 0.3 pH units, wherein the suspension conductivity change is not more than 100 µS/cm per pH unit.

"Conductivity" according to the present invention shall mean the electrical conductivity of an aqueous carbonate-comprising material suspension as measured according to the measurement method defined in the examples section herebelow.

For the purpose of the present invention, the pH shall be measured according to the measurement method defined in the examples section herebelow.

The volume % (vol. %) of a solid material in suspension is determined according to the method defined in the examples section hereafter.

A "polyethylenimine" (PEI) in the meaning of the present invention includes fragments of the general formula —(CH$_2$—CH$_2$—NH)$_n$— with n=2 to 10.000. It is to be understood that, unless indicated otherwise hereinafter, the term "polyethylenimine" or "PEI" as used herein includes polyethylenimines per se, as well as modified polyethylenimines, and mixtures of modified and unmodified materials. The polyethylenimine (PEI) according to the present invention may be a homopolymeric polyethylenimine which can be defined by the ratio of primary, secondary and tertiary amine functions.

In a preferred embodiment, the said at least one polyethylenimine additive is added as a water based solution to the calcium carbonate-comprising material.

In another preferred embodiment, the at least one polyethylenimine is selected from the group of branched polyethylenimines, linear polyethylenimines and mixtures of the foregoing. Preferably, the ratio of primary, secondary and tertiary amine functions in the inventive branched polyethylenimines is in the range of 1:0.86:0.42 to 1:1.20:0.76, prior to a possible modification of the inventive branched polyethylenimines.

According to one preferred embodiment of the present invention, the at least one polyethylenimine is selected from the group of modified and unmodified polyethylenimines.

Polyethyleneimines include for the purposes of the present invention the homopolymers of ethyleneimine (aziridine) or its higher homologues and also the graft polymers of polyamidoamines or polyvinylamines with ethyleneimine or its higher homologues. The polyethyleneimines can be crosslinked or uncrosslinked, quaternized and/or modified by reaction with alkylene oxides, dialkyl or alkylene carbonates or C1- to C8-carboxylic acids. The inventive polyethyleneimines may be modified by reaction with alkylene oxides such as ethylene oxide, propylene oxide or butylene oxide, dialkyl carbonates such as dimethyl carbonate and diethyl carbonate, alkylene carbonates such as ethylene carbonate or propylene carbonate, or C1-C8-carboxylic acids. Modified PEIs according to the present invention include alkoxylated polyethylenimines. Alkoxylated polyethylenimines (APEIs) are well-known in the art and include propoxylated polyethylenimines (PPEIs) and ethoxylated polyethylenimines (EPEIs). Current methods of making the APEI products start from a composition including polyethyleneimines (PEIs). Further preferred modified polyethylenimines can be obtained by reacting the unmodified PEIs with one or more C1-C28 fatty acids, preferably with one or more C 6-C18 fatty acids and especially preferred with C10-C14 fatty acids, like, e.g. coconut fatty acid. One method of making compositions comprising PEIs is based on the reaction of ethylenediamine (EDA) and ethylenimine (EI) under acid catalysis, in solvents such as water. An example of a common EI is aziridine. The resulting polyethylenimines (PEIs) in the composition have primary, secondary, and tertiary amine functionalities that are available for further chemical conversion, e.g. alkoxylation with alkylene oxides such as ethylene oxide to form APEI. The PEIs according to the present invention also may be made from a di- or polyamine such as ethylene diamine (EDA), ethylenimine (EI) such as aziridine, water, and an acid catalyst. Acid catalysts such as sulfuric acid, carbonic acid, or any lower carboxylic acid catalyst may be used for the production of the composition including the PEI. The PEIs in the composition are available at a broad range of molecular weights. The primary and secondary tertiary amine functionalities of the PEIs are available for further alkoxylation with alkylene oxides, such as ethylene oxide or propylene oxide, to make APEI products such as ethoxylated polyetheneimines (EPEIs), propoxylated polyethylenimines (PPEIs), respectively. Both the modified and the unmodified PEIs are well known in the art and readily available on the commercial market.

According to a preferred embodiment of the present invention, the at least one polyethylenimine is modified and preferably is modified with a carboxylic acid group, more preferably with one or more C1-C28 fatty acids, one or more C6-C18 fatty acids or with one or more C10-C14 fatty acids or is modified by alkoxylation, preferably by ethoxylation, more preferably by ethoxylation with 10 to 50 ethylene oxide group.

In a preferred embodiment of the present invention, the at least one polyethylenimine has a molecular weight in the range of 100 g/mol and 10.000 g/mol. The "molecular weight" of linear polyethylenimines may be directly calculated from the respective chemical formula. The "molecular weight" of branched polyethylenimines in the meaning of the present invention is the weight average molecular weight as being measured by light scattering (LS) techniques.

In another preferred embodiment of the present invention the at least one polyethylenimine is selected from the group of linear polyethylenimines having a molecular weight of 100 to 700 g/mol and preferably of 146 to 232 g/mol and preferably is selected from triethylenetetramine, pentaethylenehexamine and tetraethylenepentamine. A linear polyethylenimine may be defined by the general formula H—[NH—CH$_2$—CH$_2$—]$_n$—NH$_2$, wherein n preferably is an integer such as 2, 3, 4, 5, 6, 7, 8, 9, or 10.

According to yet another preferred embodiment of the present invention the at least one polyethylenimine is selected from the group of branched polyethylenimines having a weight average molecular weight of 500 to 8000 g/mol and preferably of 800 to 1200 g/mol. In the meaning of the present invention, the term "branched polyethylenimine" also encompasses "spherical polyethylenimines". A branched polyethylenimine may have the following general formula:

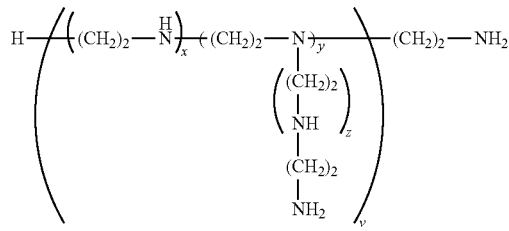

In a preferred embodiment, said suspension has a conductivity of between 700 and 2000 µS/cm, and preferably of between 800 and 1300 µS/cm, prior to the addition of the at least one polyethylenimine.

In another preferred embodiment, following the addition of the at least one polyethylenimine, the suspension conductivity change is not more than 70 μS/cm per pH unit, and preferably not more than 50 μS/cm per pH unit and the change preferably is a decrease in conductivity.

In another preferred embodiment, following the addition of the at least one polyethylenimine, the suspension conductivity does not change by more than 10%, preferably does not change by more than 6%, and more preferably does not change by more than 3%.

In another preferred embodiment, prior to addition of the at least one polyethylenimine, the suspension has a pH between 9 and 10.3.

In another preferred embodiment, the at least one polyethylenimine is added to said suspension in an amount to increase the pH of the aqueous suspension by at least 0.4 pH units.

When the suspension pH prior to the addition of the at least one polyethylenimine is between 8.5 and 9, the at least one polyethylenimine is preferably added to said suspension in an amount to increase the pH of the suspension by at least 1.0 pH units. In the case where the suspension pH prior to the addition of the at least one polyethylenimine is between 9 and 10, the at least one polyethylenimine is preferably added to said suspension in an amount to increase the pH of the aqueous suspension by at least 0.7 pH units.

Prior to the addition of the at least one polyethylenimine, said suspension preferably has a temperature of between 5 and 100° C., more preferably of between 35 and 85° C., and even more preferably of between 45 and 75° C.

In a preferred embodiment, the at least one polyethylenimine is added to said suspension in an amount of from 500 to 15000 mg, preferably of from 1000 to 5000 mg, and more preferably of 1300 to 4000 mg, per liter of the aqueous phase of said suspension.

As regards said calcium carbonate-comprising material in suspension, this material preferably comprises at least 50%, preferably of at least 80%, and more preferably of at least 98%, by weight of calcium carbonate relative to the total equivalent dry weight of said calcium carbonate-comprising material.

The calcium carbonate of said carbonate-comprising material may be a precipitated calcium carbonate (PCC), a natural ground calcium carbonate (NGCC), a surface-reacted calcium carbonate (SRCC), or a mixture thereof.

Surface-reacted calcium carbonates are understood to refer to products resulting from the reaction of a calcium carbonate with an acid and carbon dioxide, said carbon dioxide being formed in situ by the acid treatment and/or supplied externally, and the surface-reacted natural calcium carbonate being prepared as an aqueous suspension having a pH of greater than 6.0, measured at 20° C. Such products are described in, among other documents, WO 00/39222, WO 2004/083316 and EP 2 070 991, the content of these references herewith being included in the present application.

In a preferred embodiment, said suspension comprises from 45 to 60 vol. % and preferably from 48 to 58 vol. % and most preferred from 49 to 57 vol. %, of said calcium carbonate-comprising material based on the total volume of said suspension.

In another preferred embodiment, the at least one polyethylenimine is added prior to, during or after, and preferably after, a step of grinding said calcium carbonate-comprising material in said suspension It may also be advantageous that the at least one polyethylenimine be added to the dry form of said calcium carbonate-comprising material and preferably dry ground therewith before forming said suspension of calcium carbonate-comprising material.

Following addition of the at least one polyethylenimine to said suspension, the suspension may be introduced in a unit equipped with a conductivity-based regulation device.

For example, the suspension may be introduced in a container or unit up to a level determined by measurement of the suspension conductivity.

The suspension may additionally or alternatively be passed through a passage having a suspension throughput regulated as a function of the suspension conductivity.

In this respect, "passage" can relate to a confined region of throughput, as well as a throughput without any definition of confinement, i.e. after one passage of the process.

It is to be understood that the above-mentioned embodiments of the invention can be used and are contemplated to be used in combination with each other.

In view of the advantages of the use of the at least one polyethylenimine described above, a further aspect of the present invention refers to a method for increasing the pH of an aqueous suspension containing from 25 to 62 vol. % of at least one calcium carbonate-comprising material and having a pH in the range of between 8.5 and 11 is provided, wherein the method involves the step of adding the at least one polyethylenimine to the suspension in an amount, so that the pH of the suspension is increased by at least 0.3 pH units, preferably by at least 0.5 or at least 0.7 pH units and, at the same time, the suspension conductivity change caused by the addition of the at least one polyethylenimine is not more than 100 μS/cm per pH unit, preferably is not more than 50 μS/cm per pH unit and very preferably is not more than 20 μS/cm per pH unit.

According to another embodiment of the present invention, the suspensions obtained by the inventive method or use may be used in paint and/or paper applications.

It is to be understood that the advantageous embodiments described above with respect to the inventive use of the at least one polyethylenimine also can be used for the inventive method. In other words, the preferred embodiments described above and any combinations of these embodiments can also be used for the inventive method.

The scope and interest of the invention will be better understood based on the following examples which are intended to illustrate certain embodiments of the invention and are non-limitative.

EXAMPLES

Measurement Methods:
Suspension pH Measurement

The pH of a suspension is measured at 25° C. using a Mettler Toledo Seven Easy pH meter and a Mettler Toledo InLab® Expert Pro pH electrode.

A three point calibration (according to the segment method) of the instrument is first made using commercially available buffer solutions having pH values of 4, 7 and 10 at 20° C. (from Aldrich).

The reported pH values are the endpoint values detected by the instrument (the endpoint is when the measured signal differs by less than 0.1 mV from the average over the last 6 seconds).

Suspension Conductivity Measurement

The conductivity of a suspension is measured at 25° C. using Mettler Toledo Seven Multi instrumentation equipped with the corresponding Mettler Toledo conductivity expansion unit and a Mettler Toledo InLab® 730 conductivity probe, directly following stirring this suspension at 1 500 rpm using a pendraulik tooth disc stirrer.

The instrument is first calibrated in the relevant conductivity range using commercially available conductivity calibration solutions from Mettler Toledo. The influence of temperature on conductivity is automatically corrected by the linear correction mode.

Measured conductivities are reported for the reference temperature of 20° C. The reported conductivity values are the endpoint values detected by the instrument (the endpoint is when the measured conductivity differs by less than 0.4% from the average over the last 6 seconds).

Particle Size Distribution (Mass % Particles with a Diameter <X) and Weight Median Grain Diameter ($d_{50}$) of Particulate Material Weight median grain diameter and grain diameter mass distribution of a particulate material are determined via the sedimentation method, i.e. an analysis of sedimentation behavior in a gravimetric field. The measurement is made with a Sedigraph™ 5100.

The method and the instrument are known to the skilled person and are commonly used to determine grain size of fillers and pigments. The measurement is carried out in an aqueous solution of 0.1% by weight of $Na_4P_2O_7$. The samples were dispersed using a high speed stirrer and ultrasonic.

Viscosity Measurement

The Brookfield viscosity is measured after 1 minute of stirring by the use of a RVT model Brookfield™ viscometer at room temperature and a rotation speed of 100 rpm (revolutions per minute) with the appropriate disc spindle 2, 3 or 4 at room temperature.

Volume Solids (Vol. %) of a Material in Suspension

The volume solids is determined by dividing the volume of the solid material by the total volume of the aqueous suspension.

The volume of the solid material is determined by weighing the solid material obtained by evaporating the aqueous phase of suspension and drying the obtained material to a constant weight at 120° C., and converting this weight value to a volume value by division with the specific gravity of the solid material.

The examples herebelow, employing a material consisting of essentially only calcium carbonate, used a specific gravity value of 2.7 g/ml, based on that listed for natural calcite in the Handbook of Chemistry and Physics (CRC Press; 60th edition), for the purpose of the above volume solids calculation.

Weight Solids (% by Weight) of a Material in a Suspension

The weight solids is determined by dividing the weight of the solid material by the total weight of the aqueous suspension.

The weight of the solid material is determined by weighing the solid material obtained by evaporating the aqueous phase of suspension and drying the obtained material to a constant weight Additive Addition Amount in mg per Litre of Aqueous Phase of a Suspension In order to evaluate the amount of additive per litre of the aqueous phase of a suspension, the volume in litres (l) of the aqueous phase is first determined by subtracting the volume of the solid phase (see volume solids determination above) from the total volume of the suspension.

The PEIs used in the following tests are mentioned and characterized in the following table 1:

| Name | CAS Number | Formula/Mw | Boiling point |
|---|---|---|---|
| PEI 5000 (Lupasol ® G100) (branched) [2] | 9002-98-6 | 5000 g/mol | >>200° C. |
| Lupasol ® 800 (branched) [2] | 9002-98-6 | 800 g/mol | >>200° C. |
| PEI Mw 1200 g/mol (branched) [3] | 9002-98-6 | 1200 g/mol | >>200° C. |
| Triethylenetetramine [1] | 112-24-3 | $H(NHCH_2CH_2)_3NH_2$ 146 g/mol | approx. 270-300° C. |
| Pentaethylenehexamine [1] | 4067-16-7 | $H(NHCH_2CH_2)_5NH_2$ 232 g/mol | approx. 220-290° C. (at 20 mbar) |
| Tetraethylenepentamine [1] | 112-57-2 | $H(NHCH_2CH_2)_4NH_2$ 189 g/mol | approx. 190-240° C. (at 20 mbar) |

[1] according to technical data sheet LANXESS Distribution GmbH
[2] according to technical data sheet BASF
[3] according to technical data sheet Sigma-Aldrich Example 1

This example implements a natural calcium carbonate of Norwegian origin obtained by first autogeneously dry grinding 10 to 300 mm calcium carbonate rocks to a fineness corresponding to a $d_{50}$ of between 42 to 48 µm, and subsequently wet grinding this dry-ground product in water to which 0.65% by weight, based on the equivalent dry weight of the solids material, of a sodium and magnesium-neutralised polyacrylate (Mw=6 000 g/mol, Mn=2 300 g/mol), in a 1.4-litre vertical atritor mill (Dynomill 1.4 L, Bachofen, Switzerland, using 2.7 kg $ZrO_2/ZrSiO_4$ beads of 0.7-1.5 mm)at a weight solids content of 77.5% by weight, and recirculated through the mill until 90% by weight of the particle have a diameter <0.2 µm, 65% by weight of the particle have a diameter <1 µm, 15% by weight of the particle have a diameter <0.2µ and a $d_{50}$ and a $d_{50}$ of approximately 0.8 µm is reached.

The obtained suspension is then diluted to a volume solids content of 56.9% by volume.

0.4 kg of this suspension are introduced in a 1-litre beaker having a diameter of 8 cm. A pendraulik tooth disc stirrer, is introduced in the beaker such the stirrer disk is located approximately 1 cm above the bottom of the beaker. The initial suspension conductivity and pH values measured are reported in the table below.

Under stirring at 5000 rpm, the additive type (in the form of an aqueous solution) indicated in each of the tests described in the table below (PA=additive according to the prior art, IN=additive according to the present invention), is added in the indicated amount to the slurry over a period of one minute.

After completed addition, the slurry is stirred for an additional 5 minutes, after which time the suspension pH and the conductivity are measured.

TABLE 2

| Test | | Suspension volume solid content (vol. %) | Initial suspension conductivity (+/−10 µS/cm)/pH (+/−0.1) | Additive Type (in solution)/ Solution concentration | Additive addition amount (mg/L of aqueous phase) | Conductivity (+/−10 µS/cm)/ pH (+/−0.1) after additive addition | Δ Conductivity |
|---|---|---|---|---|---|---|---|
| 1 | PA | 56.9 | 1024/8.8 | KOH/30% | 3565 | 1767/12.9 | +743 |
| 2 | IN | 56.9 | 1029/9.0 | PEI Mw 5000 (Lupasol ® G100) | 3411 | 929/10.22 | −82 |
| 3 | IN | 56.9 | 1101/8.7 | PEI Mw 1200 g/mol | 3546 | 1062/9.2 | −87 |
| 4 | IN | 56.9 | 1177/8.3 | PEI 800 | 3546 | 1078/10.4 | −61 |
| 5 | IN | 56.9 | 1065/8.0 | Pentaethylene-hexamine | 3387 | 910/10.0 | −78 |
| 6 | IN | 56.9 | 1065/8.0 | Tetraethylene-pentamine | 3387 | 946/10.3 | −52 |
| 7 | IN | 56.9 | 1065/8.0 | Triethylene-tetramine | 3387 | 960/10.2 | −48 |

Differences in the pH, conductivity and viscosity of the initial suspension are due to aging effects of the suspension.

Further detailed experimental results for different amounts of added additive are given in the table below.

TABLE 3

| Test | Additive addition amount (mg/L of aqueous phase) | Brookfield viscosity [mPas] at 23° C. ± 2° C. | pH at 23° C. ± 2° C. | Conductivity at 23° C. ± 2° C. |
|---|---|---|---|---|
| 2 | 0 | 468 | 9 | 1029 |
| | 567 | 455 | 9.31 | 1004 |
| | 1138 | 473 | 9.34 | 985 |
| | 1706 | 498 | 9.44 | 970 |
| | 2273 | 620 | 9.84 | 950 |
| | 2840 | 944 | 10.11 | 932 |
| | 3411 | 1240 | 10.22 | 929 |

The results of the above table show that the objectives and advantages of the present invention (especially the stable conductivity) are attained by the using the inventive PEIs.

The invention claimed is:

1. An aqueous suspension comprising from 25 to 62 vol. % of at least one calcium carbonate-comprising material and at least one polyethylenimine, and having a pH in the range of between 8.5 and 11, wherein the aqueous suspension is obtained by adding the at least one polyethylenimine to the suspension in an amount of from 500 to 15000 mg per liter of the aqueous phase of the suspension, so that the pH of the suspension is increased by at least 0.3 pH units and the conductivity change is not more than 100 µS/cm per pH unit.

2. The suspension according to claim 1, wherein the least one polyethylenimine additive is added as a water based solution to the calcium carbonate-comprising material.

3. The suspension accordingly to claim 1, wherein the at least one polyethylenimine is selected from the group consisting of branched polyethylenimines, linear polyethylenimines and mixtures thereof.

4. The suspension according to claim 1, wherein the at least one polyethylenimine is selected from the group consisting of modified polyethylenimine, unmodified polyethylenimines and mixtures thereof.

5. The suspension according to claim 1, wherein the at least one polyethylenimine has a molecular weight in the range of 100 g/mol and 10.000 g/mol.

6. The suspension according to claim 1, wherein the at least one polyethylenimine is a linear polyethylenimine having a molecular weight of 100 to 700 g/mol.

7. The suspension according to claim 1, wherein the at least one polyethylenimine is a linear polyethylenimine having a molecular weight of 146 to 232 g/mol.

8. The suspension according to claim 1, wherein the at least one polyethylenimine is triethylenetetramine, pentaethylene-hexamine or tetraethylenepentamine.

9. The suspension according to claim 1, wherein the at least one polyethylenimine is a branched polyethylenimine having a molecular weight of 500 to 8000 g/mol, wherein the ratio of primary, secondary and tertiary amine functions in the branched polyethylenimine is in the range of 1:0.86:0.42 to 1:1.20:0.76, prior to optional modification of the branched polyethylenimine.

10. The suspension according to claim 1, wherein the at least one polyethylenimine is a branched polyethylenimine having a molecular weight of 800 to 1200 g/mol, wherein the ratio of primary, secondary and tertiary amine functions in the branched polyethylenimine is in the range of 1:0.86:0.42 to 1:1.20:0.76, prior to optional modification of the branched polyethylenimine.

11. The suspension according to claim 1, wherein the at least one polyethylenimine is modified with a carboxylic acid group, one or more C1-C28 fatty acids, one or more C6-C18 fatty acids, or one or more C10-C14 fatty acids, and/or is modified by alkoxylation, ethoxylation, or ethoxylation with 10 to 50 ethylene oxide group.

12. The suspension according to claim 1, wherein the at least one polyethylenimine is added to the suspension in an amount of from 1000 to 5000 mg per liter of the aqueous phase of the suspension.

13. The suspension according to claim 1, wherein the at least one polyethylenimine is added to the suspension in an amount of from 1300 to 4000 mg per liter of the aqueous phase of the suspension.

14. The suspension according to claim 1, wherein the calcium carbonate-comprising material comprises at least 50% by weight of calcium carbonate relative to the total weight of the calcium carbonate-comprising material.

15. The suspension according to claim 1, wherein the calcium carbonate-comprising material comprises at least 80% by weight of calcium carbonate relative to the total weight of the calcium carbonate-comprising material.

16. The suspension according to claim 1, wherein the calcium carbonate-comprising material comprises at least 98% by weight of calcium carbonate relative to the total weight of the calcium carbonate-comprising material.

17. The suspension according to claim 1, wherein the calcium carbonate of the carbonate-comprising material is a precipitated calcium carbonate (PCC), a natural ground calcium carbonate (NGCC), a surface-reacted calcium carbonate (SRCC), or any mixture thereof.

18. The suspension according to claim 1, wherein the suspension comprises from 45 to 60 vol. % of the calcium carbonate-comprising material based on the total volume of the suspension.

19. The suspension according to claim 1, wherein the suspension comprises from 48 to 58 vol. % of the calcium carbonate-comprising material based on the total volume of the suspension.

20. The suspension according to claim 1, wherein the suspension comprises from 49 to 57 vol. % of the calcium carbonate-comprising material based on the total volume of the suspension.

21. A paint or paper comprising or prepared from the suspension according to claim 1.

* * * * *